United States Patent [19]

Bollinger

[11] 4,205,872
[45] Jun. 3, 1980

[54] VEHICLE FRAME

[75] Inventor: Lynn L. Bollinger, Arlington, Tex.

[73] Assignee: Pylo Dynamics Ltd., Hicksville, N.Y.

[21] Appl. No.: 848,679

[22] Filed: Nov. 4, 1977

[51] Int. Cl.² ............................................. B62D 21/00
[52] U.S. Cl. .................................... 296/205; 280/798
[58] Field of Search ......................... 296/28 J, 28 R; 280/106 R, 101 T, 798

[56] References Cited

U.S. PATENT DOCUMENTS

| 190,311 | 5/1877 | Graham | 296/28 R |
|---|---|---|---|
| 1,372,148 | 3/1921 | Lancia | 296/28 R |
| 1,523,136 | 1/1925 | Dunn | 296/28 J |
| 1,581,931 | 4/1926 | Lamplugh | 296/28 R |
| 1,915,117 | 6/1933 | Baster et al. | 296/28 J |
| 2,068,715 | 1/1937 | Stevens | 296/28J |
| 2,191,572 | 2/1940 | Maier | 296/28 R |
| 2,656,214 | 10/1953 | Alamagny | 296/28 R |
| 2,797,954 | 7/1957 | Uhlenhaut | 296/28 J |
| 3,292,968 | 12/1966 | Halibrand et al. | 296/28 J |
| 3,616,872 | 11/1971 | Taylor | 180/65 R |
| 4,045,075 | 8/1977 | Pulver | 296/28 J |

Primary Examiner—Richard A. Bertsch
Attorney, Agent, or Firm—John J. Byrne

[57] ABSTRACT

Disclosed is a vehicle frame comprising at least two closed, planar, continuously non-concave, at least generally oval, centrally open structural members positioned transversely to the axis of a vehicle, inclined towards each other, and joined into a triangular truss. Additional whole or partial structural members of this type may be added to increase the length of the vehicles in cellular fashion.

34 Claims, 6 Drawing Figures

VEHICLE FRAME

FIELD OF THE INVENTION

This invention relates generally to vehicle frames. It is disclosed in the context of automobile and bus frames, but it is equally applicable to airplane and boat frames.

GENERAL DESCRIPTION OF THE INVENTION

The subject invention involves as a key component a unique new combination of essentially circular (or structurally similar) components mounted so as to be sloping in opposite directions, providing a generally V (or inverted V) shaped element when viewed from the side of the vehicle and a generally oval shaped element when viewed from either end. The open end of the V is connected at or near the bottom by one or more structural members shaped to resist fore-and-aft compression and tension loads. The resulting basic structural module is a triangular truss when viewed from the side and ovular in end view. Short, straight sections can be inserted or formed in the generally circular elements at the bottom, at the top, and/or on each side of the convex, vertically shaping primary members in such a way as to still maintain essentially the same torsional rollover, and side-impact strength of the ovular cross-section combined with the optimal fore-and-aft bending moment strength provided by the fore-and-aft truss shape. In addition, resistance to asymmetrical shear loads is provided by the diagonal cross shapes found by the sloping circles.

The structural modules of the subject invention are easily and inexpensively formed from tubes or bars, and each structural piece performs simultaneously three essential functions which have heretofor required more complex and heavier structures. The subject invention thus reduces the member of components of a vehicle's frame to a minimum and causes each component to interact with the adjacent member so as to resist with unusual combined effectiveness the full range of bending, compression, tension, torsional, and shear loads. In addition, the same module effectively protects the vehicle occupants from multi-directional collision impacts and roll-overs. Moreover, this placement of essentially all of the primary load bearing structure on the outer perimeter of the vehicle in a geometrically uniform manner permits that primary structure to carry the external covering, door, and window loads as well.

The multi-purpose capability of each component saves significantly on weight and material costs. The resulting strength-to-weight ratio also makes possible significant reductions in motive power and fuel consumption without loss of performance.

The only other structural methodology known to be capable of providing an unobstructed interior in combination with similar operational load-bearing efficiency is the well-known "stressed skin" form of construction. That type of construction is, however, believed to be practical only for vehicles such as aircraft and submarines which have only a few, relatively small doors and relatively small, non-opening windows. By contrast, where multiple, frequently used doors and relatively large, openable windows are required, as in most passenger-carrying ground vehicles, the subject invention provides an unusual combination of load-carrying and safety capabilities together with savings in weight and materials significantly exceeding that attained by any other structural combination developed heretofor.

OBJECTS OF THE INVENTION

It is an important object of this invention to provide a vehicle frame which defines a vehicle interior which is an efficient shape for human or cargo loads and which is formed from a minimum number of structural components, each of which carries all structural loads with optimal efficiency while at the same time providing suitable supports for external coverings for the vehicle.

It is another important object of this invention to provide a vehicle frame which provides an optimized degree of multidirectional protection from crashes and vehicle roll overs.

Other objects and advantages of the present invention will become apparent from the following detailed descriptions of several preferred embodiments taken in conjunction with the accompanying drawings.

DETAILED DESCRIPTION OF THE PRESENTLY PREFERRED EMBODIMENTS

The four specifically different vehicle frames shown in FIGS. 1 through 6 all comprise at least two closed, planar, continuously non-concave, at least generally oval, centrally open structural members positioned transversely to the axis of a vehicle, inclined towards each other, and joined into a triangular truss.

Figure 4:
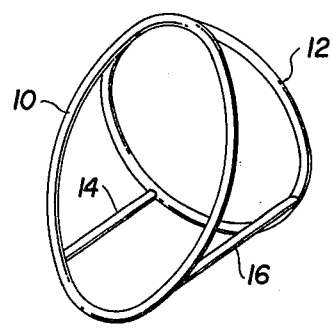
FIG. 4 is a perspective view of a second embodiment of the subject invention.

Turning first to FIG. 4, which shows the basic module in its simplest (and strongest) form, it will be seen that the frame shown therein comprises two oval structural members 10 and 12 formed from metal tubing and connected together at their tops by welding and at their bottoms by two linear structural members 14 and 16 positioned parallel to the axis of the vehicle. While the preferred structural material at the present state of the art is either aluminum or steel tubing, it is believed that, in the forseable future, compound materials, such as plastic bonded boron filaments, that offer higher strengths at lower weights will become available in tube or bar form. All such materials, in whatever cross-section (i.e. U, H, I, T, etc.) would be appropriately used in the subject invention.

Figure 1:
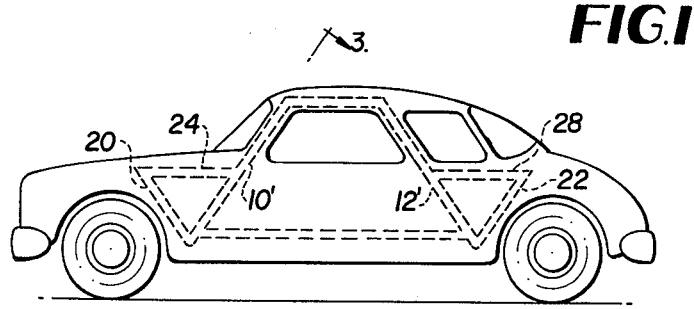
FIG. 1 is a side view of an automobile showing a first embodiment of the subject invention in phantom lines.
Figure 2:
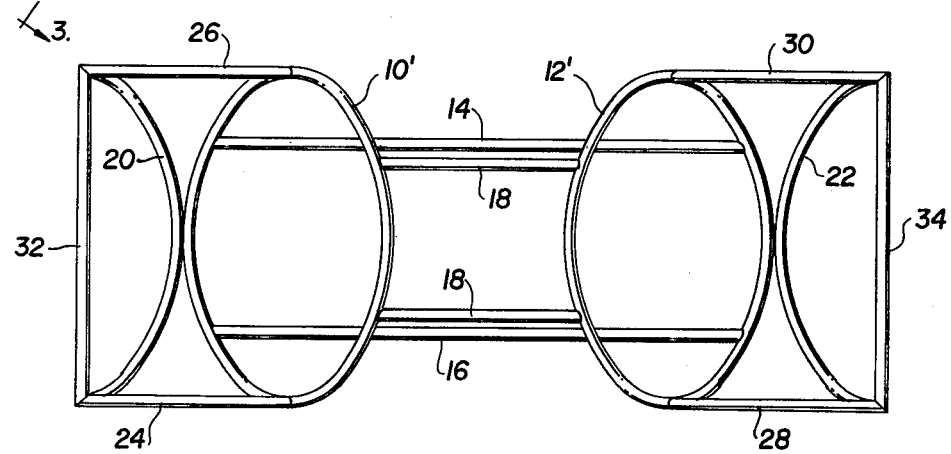
FIG. 2 is a top view of the frame shown in phantom lines in FIG. 1.
Figure 3:
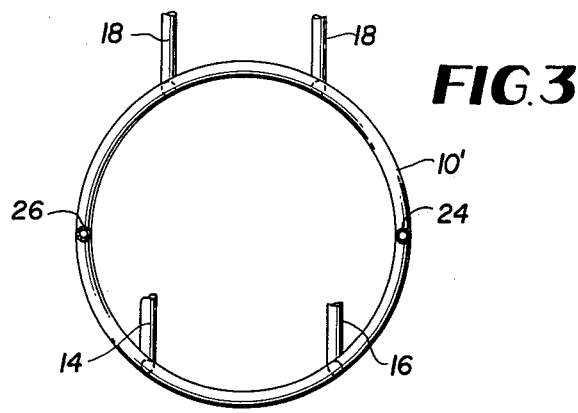
FIG. 3 is a view of a portion of the frame shown in FIG. 1 taken along the line 3—3 in FIG. 1.

Turning next to FIGS. 1 through 3, it will be seen that the frame shown therein comprises two circular structural members 10' and 12' connected together at their bottoms as before by two linear structural members 14 and 16. However, this time the structural members 10' and 12' are connected together at their tops by two linear structural members 18. (Although not illustrated, it should be noted that the linear structural members 18 could be replaced by one or more structural members curved to conform to the top curvature of the vehicle body.) Finally, turning to FIGS. 5 and 6, it will be seen that each frame shown therein comprises at least one of the basic modules as well as further structure described hereinafter.

Before describing the additional structure, it is appropriate to point out here that the members 10 and 12 need not be circular or oval as shown, nor need they even be continuously convexly curved. In particular, it is entirely possible to provide short flat sides, particularly at the top, bottom, and at the maximum width sides of the vehicle to widen or heighten it. These short flat sides can be used, for example, to increase the height of the framework without increasing its width. However, these flat sides must not be of a length which interferes with the framework's ability to act as an oval. Similarly, the members 10 and 12 need not be symmetric about a central horizontal plane; they can be pear shaped. Moreover, the two members 10 and 12 do not have to be identical size and shape; one can be smaller than the other, producing a conical shape overall. The basic requirements are simply that, when viewed from the side, the members 10 and 12 and the means 14 form a truss capable of carrying efficiently both the normal bending, compression, and tension loads and the abnormal loads to which the frame may be subjected during crashes and vehicle roll overs, and, when viewed from the front or the rear, the members 10 and 12 constitute a torsion and compression bearing member.

Figure 5:
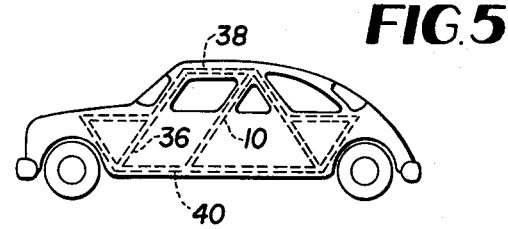
FIG. 5 is a side view of an automobile showing a third embodiment of the subject invention in phantom lines.

In addition to one or more of the basic modules, it is often appropriate to incorporate one or more partial modules into the frame, particularly at the front or rear of the vehicle. As shown in FIGS. 1, 2, and 5, such partial modules can comprise planar, continuously non-concave, centrally open structural members 20, 22 at least generally in the shape of an upwardly open half oval (preferably, an upwardly open semicircle). The member 20 is positioned in front of the member 10' and inclined towards the front of the vehicle; the member 22 is positioned behind the member 12' and inclined towards the rear of the vehicle. The members 20 and 22 are both positioned transversely to the axis of the vehicle, and preferably the member 20 is parallel to the member 12' and the member 22 is parallel to the member 10'. The member 20 is connected to the member 10' at their bottoms, and the member 22 is connected to the member 12' at their bottoms. If the members 10', 12', 20 and 22 are made of metal, this can conveniently be accomplished by welding. Similarly, the top of the member 20 is connected to the member 10' by two linear structural members 24, 26, and the top of the member 22 is connected to the member 12' by two linear structural members 28, 30. Since the half oval form lacks the strength provided by the full oval, a crossbrace 32 preferably spans the open top of the member 20. As with the basic module, the partial module is preferably formed from metal tubing and may include short flat sides and/or linear connections at the apex formed where the members 20, 22 approach the member 10', 12'.

A further variation on the basic theme is shown in FIG. 5. The frame shown in this figure comprises the basic module and a third closed, planar, continuously non-concave, at least generally oval, centrally open structural member 36 positioned transversely to the axis of the vehicle and inclined towards its rear. The top of the member 36 is connected to the top of the member 10 by a linear structural member 38, and the bottom of the member 36 is connected to the bottom of the member 10 by a linear structural member 40. As shown, the member 36 is preferably parallel to the member 10, and a partial module may be joined to the member 36 rather than directly to member 10.

Figure 6:
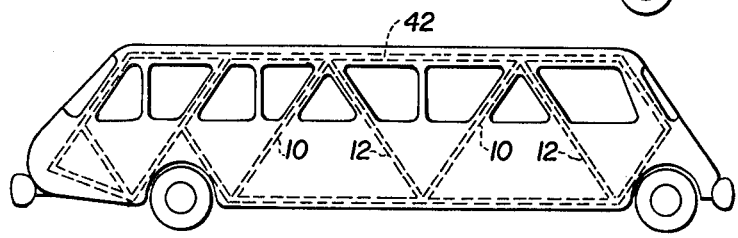
FIG. 6 is a side view of a small bus incorporating the subject invention.

Finally, FIG. 6 shows a frame which may be visualized as a plurality of the basic modules interconnected by inverted modules. That is, the trailing edge of one of the basic modules is connected to the leading edge of another, and the member 12 from the leading module is connected to the member 10 of the trailing module by a linear structural member 42. Of course, what has been said previously about permissible variation in the basic modules is equally applicable to this embodiment.

While the divergent ends of the basic module have been shown as connected by two separate linear members, they may be connected by a single, centrally positioned member or even by the external covering of the vehicle, in which case the external covering also serves as the compression tension bearing member for the lower section of the truss.

ADVANTAGES OF THE INVENTION

From the foregoing description of several embodiments of a vehicle frame in accordance with the subject invention, those skilled in the art will recognize several advantages which singularly distinguish the subject invention from previously known vehicle frames. Some of those advantages are set forth below. However, while the following list of advantages is believed to be both accurate and representative, it does not purport to be exhaustive.

A particular advantage of the subject vehicle frame is that it is formed from a minimum number of structural components, each of which carries all structural loads with optimal efficiency while at the same time providing suitable supports for external coverings for the vehicle.

A further advantage of the subject vehicle frame is that it provides an optimized degree of multi-directional protection from crashes and vehicle roll overs.

Yet a further advantage of the subject vehicle frame is that it defines a vehicle interior which is an efficient shape for human or cargo loads.

Still a further advantage of the subject vehicle frame is that it is sufficiently lighter than conventional vehicle frames to provide a significant reduction in the motive energy required to power the vehicle.

Caveat

While the present invention has been illustrated by a detailed description of several preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:

1. A vehicle frame adapted to carry the external covering of the vehicle, said vehicle frame comprising:
    (a) a first closed, planar, continuously non-concave, at least generally oval, centrally open structural member positioned transversely to the axis of a vehicle and inclined towards the rear of the vehicle;
    (b) a second closed, planar, continuously non-concave, at least generally oval, centrally open structural member positioned behind said first member, transversely to the axis of the vehicle, and inclined towards the front of the vehicle;
(c) first means connecting the top of said first member to the top of said second member;
(d) second means connecting the bottom of said first member to the bottom of said second member; and
(e) said first and second members and said first and second means forming a triangular truss when viewed from the side and an open, generally oval shape when viewed from the end,
whereby the primary load bearing structure is placed on the outer perimeter of the vehicle in a geometrically uniform manner, permitting that structure to carry the external covering, door, and window loads as well.

2. A vehicle frame as recited in claim 1 wherein said first member is circular.

3. A vehicle frame as recited in claim 1 wherein said first member is continuously convexly curved.

4. A vehicle frame as recited in claim 1 wherein said first member is formed from metal tubing.

5. A vehicle frame as recited in claim 1 wherein said first and second members are in contact with each other at their tops.

6. A vehicle frame as recited in claim 1 wherein said second means comprises at least one linear structural member positioned parallel to the axis of the vehicle.

7. A vehicle frame as recited in claim 1 and further comprising:
(a) a third planar, continuously non-concave, centrally open structural member at least generally in the shape of an upwardly open half oval, said third structural member being positioned in front of said first member, transversely to the axis of the vehicle, and inclined towards the front of the vehicle;
(b) third means connecting the top of said third member to said first member; and
(c) fourth means connecting the bottom of said third member to the bottom of said first member.

8. A vehicle frame as recited in claim 7 wherein said third member is semicircular.

9. A vehicle frame as recited in claim 7 wherein said third member is continuously convexly curved.

10. A vehicle frame as recited in claim 7 wherein said third member is formed from metal tubing.

11. A vehicle frame as recited in claim 7 wherein said first and third members are in contact with each other at their bottoms.

12. A vehicle frame as recited in claim 7 wherein said third means comprises at least one linear structural member positioned parallel to the axis of the vehicle.

13. A vehicle frame as recited in claim 7 wherein said second and third membmers are parallel to one another.

14. A vehicle as recited in claim 1 and further comprising:
(a) a third planar, continuously non-concave, centrally open structural member at least generally in the shape of an upwardly open half oval, said third structural member being positioned behind said second member, transversely to the axis of the vehicle, and inclined towards the rear of the vehicle;
(b) third means connecting the top of said third member to said second member; and
(c) fourth means connecting the bottom of said third member to the bottom of said second member.

15. A vehicle frame as recited in claim 14 wherein said third member is semi-circular.

16. A vehicle frame as recited in claim 14 wherein said third member is continuously convexly curved.

17. A vehicle frame as recited in claim 14 wherein said third member is formed from metal tubing.

18. A vehicle frame as recited in claim 14 wherein said second and third members are in contact with each other at their bottoms.

19. A vehicle frame as recited in claim 14 wherein said third means comprises at least one linear structural member positioned parallel to the axis of the vehicle.

20. A vehicle frame as recited in claim 14 wherein said first and third members are parallel to one another.

21. A vehicle frame as recited in claim 1 and further comprising
(a) a third closed, planar, continuously non-concave, at least generally oval, centrally open structural member positioned transversely to the axis of the vehicle and inclined towards the rear of the vehicle;
(b) third means connecting the top of said first member to the top of said third member; and
(c) fourth means connecting the bottom of said third member to the bottom of said first member.

22. A vehicle as recited in claim 21 wherein said third member is circular.

23. A vehicle frame as recited in claim 21 wherein said third member is continuously convexly curved.

24. A vehicle frame as recited in claim 21 wherein said third member is formed from metal tubing.

25. A vehicle frame as recited in claim 21 wherein said third means comprises at least one linear structural member positioned parallel to the axis of the vehicle.

26. A vehicle frame as recited in claim 21 wherein said fourth means comprises at least one linear structural member positioned parallel to the axis of the vehicle.

27. A vehicle frame as recited in claim 21 wherein said first and third members are parallel to one another.

28. A vehicle frame as recited in claim 1 and further comprising:
(a) a third closed, planar, continuously non-concave, at least generally oval, centrally open structural member positioned transversely to the axis of the vehicle and inclined towards the front of the vehicle;
(b) third means connecting the top of said second member to the top of said third member; and
(c) fourth means connecting the bottom of said second member to the bottom of said third member.

29. A vehicle as recited in claim 28 wherein said third member is circular.

30. A vehicle frame as recited in claim 28 wherein said third member is continuously convexly curved.

31. A vehicle frame as recited 28 wherein said third member is formed from metal tubing.

32. A vehicle frame as recited in claim 28 wherein said third means comprises at least one linear structural member positioned parallel to the axis of the vehicle.

33. A vehicle frame as recited in claim 28 wherein said fourth means comprises at least one linear structural member positioned parallel to the axis of the vehicle.

34. A vehicle frame as recited in claim 28 wherein said second and third members are parallel to one another.

* * * * *

UNITED STATES PATENT AND TRADEMARK OFFICE
CERTIFICATE OF CORRECTION

PATENT NO. : 4,205,872

DATED : June 3, 1980

INVENTOR(S) : LYNN L. BOLLINGER

It is certified that error appears in the above—identified patent and that said Letters Patent are hereby corrected as shown below:

On the cover sheet delete Item [73] Assignee in its entirety.

Signed and Sealed this

Ninth Day of September 1980

[SEAL]

Attest:

SIDNEY A. DIAMOND

Attesting Officer — Commissioner of Patents and Trademarks